US012148552B2

(12) United States Patent
Arano et al.

(10) Patent No.: US 12,148,552 B2
(45) Date of Patent: Nov. 19, 2024

(54) TEMPERATURE SENSOR AND METHOD OF MANUFACTURING TEMPERATURE SENSOR

(71) Applicant: SHIBAURA ELECTRONICS CO., LTD., Saitama (JP)

(72) Inventors: Daisuke Arano, Saitama (JP); Morihisa Hamada, Saitama (JP)

(73) Assignee: SHIBAURA ELECTRONICS CO., LTD., Saitama (JP)

( * ) Notice: Subject to any disclaimer, the term of this patent is extended or adjusted under 35 U.S.C. 154(b) by 333 days.

(21) Appl. No.: 17/758,177

(22) PCT Filed: Dec. 3, 2020

(86) PCT No.: PCT/JP2020/045048
§ 371 (c)(1),
(2) Date: Jun. 29, 2022

(87) PCT Pub. No.: WO2021/145088
PCT Pub. Date: Jul. 22, 2021

(65) Prior Publication Data
US 2023/0040761 A1 Feb. 9, 2023

(30) Foreign Application Priority Data
Jan. 14, 2020 (JP) ................. 2020-003591

(51) Int. Cl.
*H01C 7/00* (2006.01)
*G01K 7/22* (2006.01)
(Continued)

(52) U.S. Cl.
CPC ............... *H01C 7/008* (2013.01); *G01K 7/22* (2013.01); *H01C 1/01* (2013.01); *H01C 7/02* (2013.01); *H01C 7/04* (2013.01)

(58) Field of Classification Search
CPC . H01C 7/008; H01C 7/02; H01C 7/04; H01C 1/01; G01K 7/22
See application file for complete search history.

(56) References Cited

U.S. PATENT DOCUMENTS 3,537,053 A * 10/1970 Russell .................. H02K 11/25
338/26
4,789,850 A 12/1988 Sepso et al.
(Continued)

FOREIGN PATENT DOCUMENTS

CN        108106750 A      6/2018
JP         854156584 U     10/1979
(Continued)

OTHER PUBLICATIONS

Office action Japanese Patent Application No. 2021-539905 dated Oct. 29, 2021 and translation thereof.
(Continued)

*Primary Examiner* — Kyung S Lee
(74) *Attorney, Agent, or Firm* — Pearne & Gordon LLP

(57) ABSTRACT

A temperature sensor includes: a first supporting film made of an electric insulation material; a second supporting film that is made of an electric insulation material and is stacked on the first supporting film; and a sensor element provided between the first supporting film and the second supporting film. The sensor element includes a thermosensitive body having electric characteristics that change with temperature, and a first lead pattern and a second lead pattern that are electrically connected to the thermosensitive body. The first supporting film and the second supporting film are disposed to face each other in a region where the thermosensitive body is provided.

10 Claims, 16 Drawing Sheets

(51) Int. Cl.
*H01C 1/01* (2006.01)
*H01C 7/02* (2006.01)
*H01C 7/04* (2006.01)

(56) References Cited

U.S. PATENT DOCUMENTS

| | | | |
|---|---|---|---|
| 9,989,421 B2 * | 6/2018 | Hua | G01K 7/22 |
| 10,782,190 B1 * | 9/2020 | Gregory | C04B 41/4515 |
| 11,781,919 B2 * | 10/2023 | Clements | G01K 3/14 |
| | | | 374/170 |
| 2020/0249097 A1 | 8/2020 | Ogura | |
| 2021/0223114 A1 * | 7/2021 | Nojiri | G01J 5/02 |

FOREIGN PATENT DOCUMENTS

| | | | |
|---|---|---|---|
| JP | H08-128901 A | 5/1996 | |
| JP | 2000-266608 A | 9/2000 | |
| JP | 2014-70953 A | 4/2014 | |
| JP | 6606308 B2 | 10/2019 | |

OTHER PUBLICATIONS

International Search Report for PCT/JP2020/045048 dated Feb. 22, 2021.

\* cited by examiner

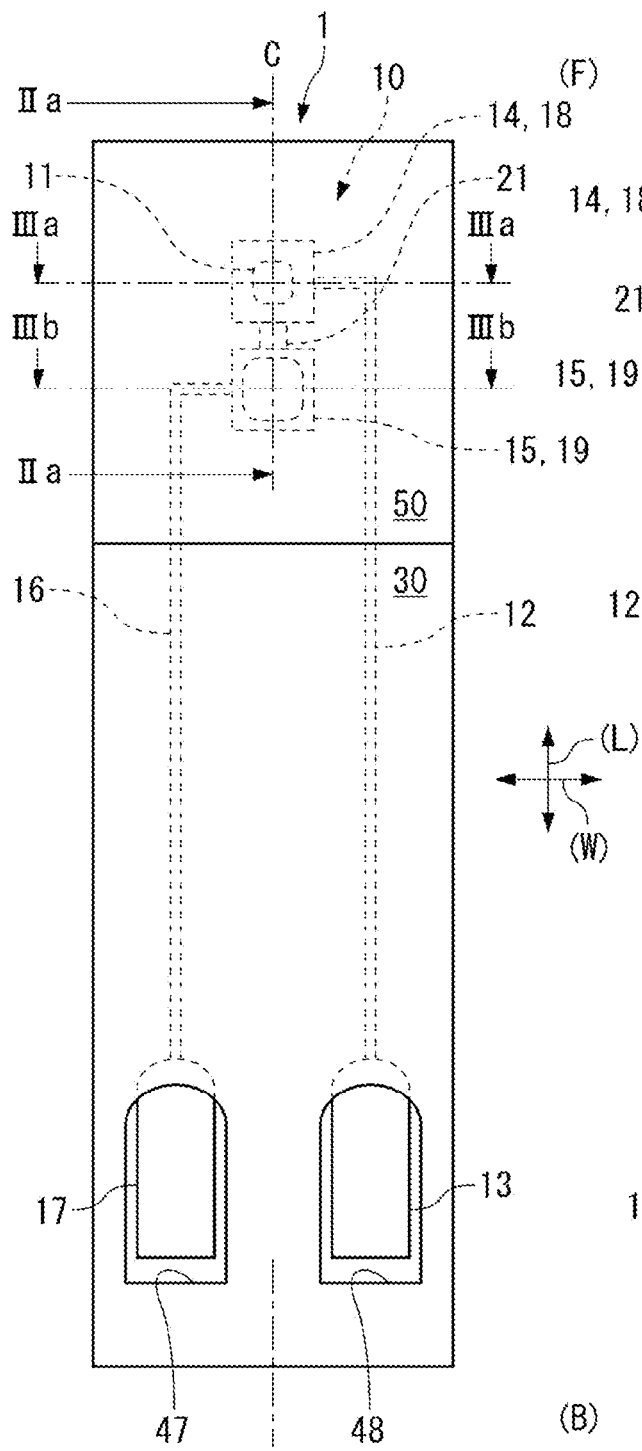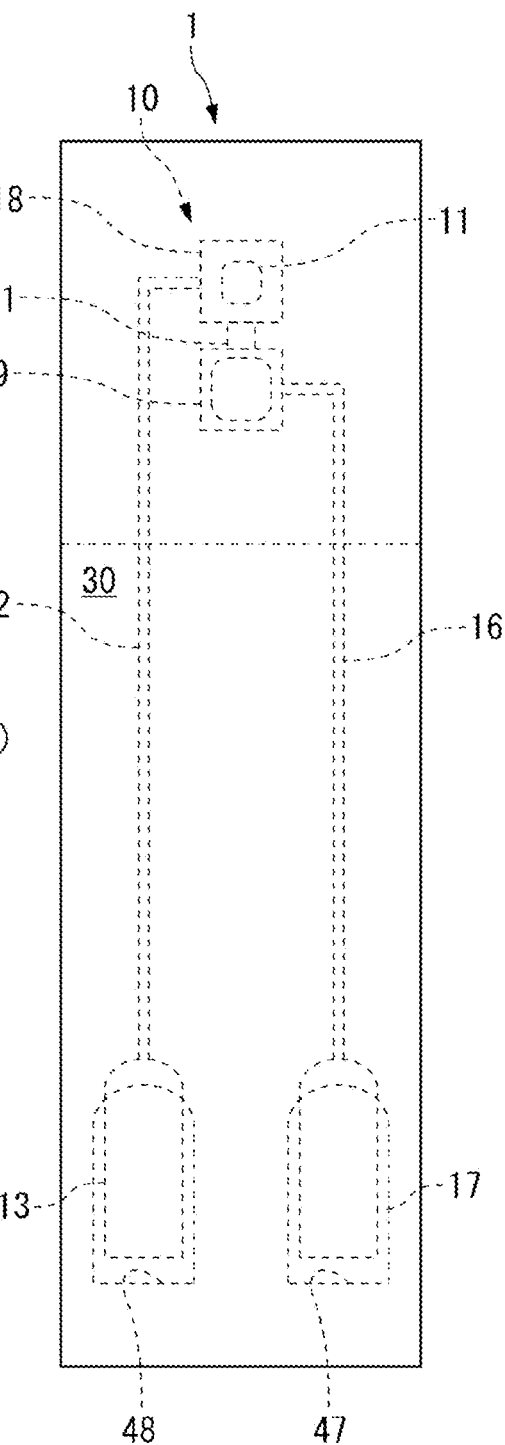

IIIa-IIIa

IIIb-IIIb

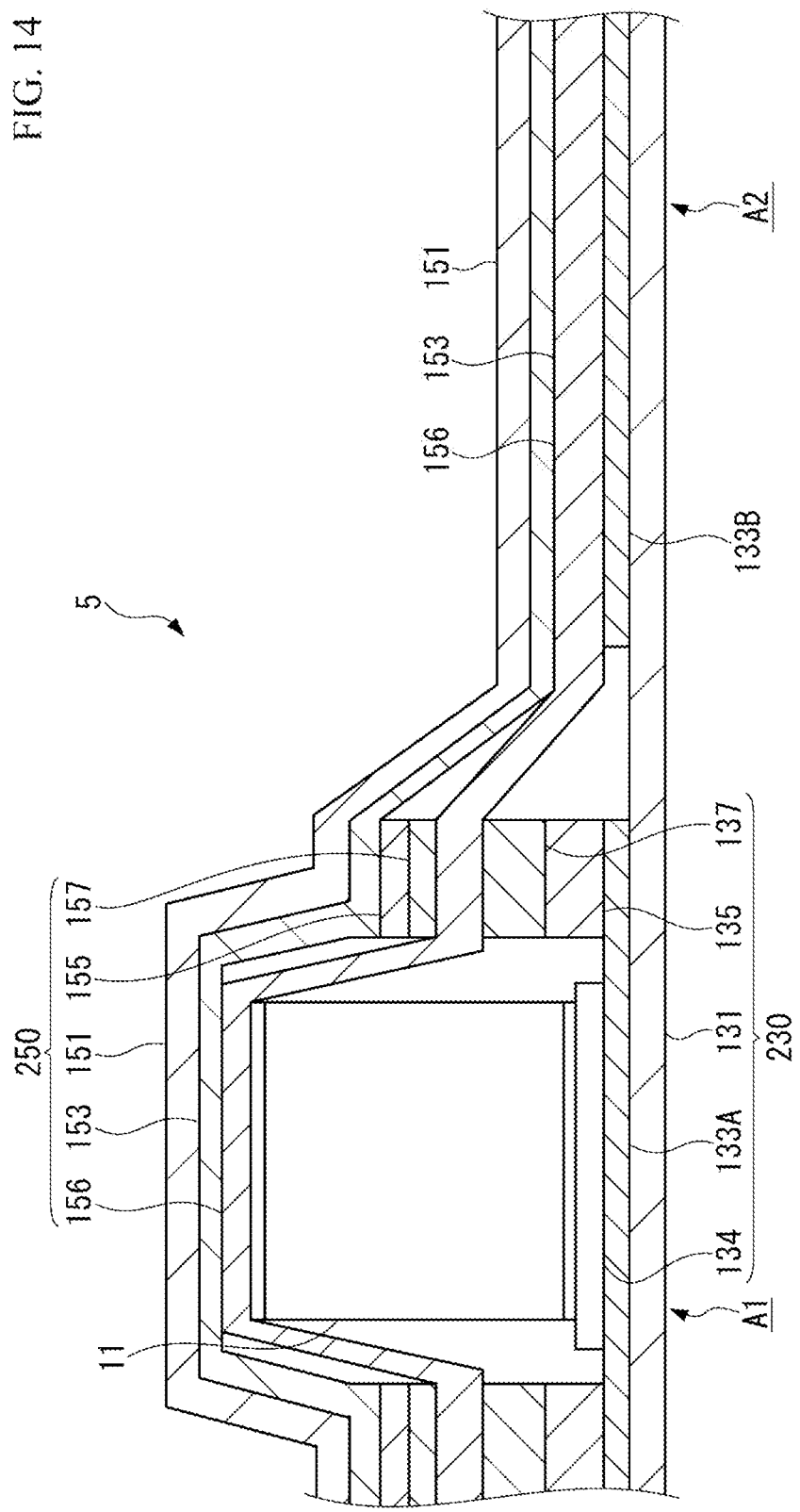

TEMPERATURE SENSOR AND METHOD OF MANUFACTURING TEMPERATURE SENSOR

CROSS-REFERENCE TO RELATED APPLICATIONS

This is a National Stage application of PCT international application PCT/JP2020/045048, filed on Dec. 3, 2020 which claims priority from Japanese Patent Application No. 2020-003591, filed on Jan. 14, 2020, the contents of which are incorporated herein by reference in their entireties.

TECHNICAL FIELD

The present invention relates to a temperature sensor, and particularly to a temperature sensor that can be reduced in thickness.

BACKGROUND ART

There is a temperature sensor that detects a temperature by using a thermistor (abbreviation for thermally sensitive resistor) having a property that electric resistance varies with the temperature. There are various measurement targets of the temperature sensor, and the temperature sensor is required to have durability corresponding to a use environment. Examples of the durability include heat resistance, water resistance, chemical resistance, and oil resistance. Further, it is necessary for the temperature sensor to meet requirements about a dimension and a shape in relation to the measurement target. In terms of the dimension and the shape, for example, the temperature sensor is required to be thin enough to be inserted into an extremely narrow space, thereby measuring the temperature of the measurement target.

For example, Patent Literature 1 and Patent Literature 2 each disclose a thin temperature sensor.

The temperature sensor disclosed in Patent Literature 1 includes a sensor element, a lead wire connected to the sensor element, and a package covering a part of the lead wire and the sensor element. The package includes two layers of insulation film adhered to each other, and the sensor element and the part of the lead wire are sandwiched between and covered by the two layers of insulation film.

In the temperature sensor disclosed in Patent Literature 2, a thermistor element, an extension wire, and a connection part between the extension wire and a lead wire are covered with an inner layer, and are also covered by a pair of outer layers by being sandwiched therebetween. In addition, surfaces of the pair of outer layers are flat including portions corresponding to the thermistor element, the extension wire, and the connection part between the extension wire and the lead wire.

CITATION LIST

Patent Literature

Patent Literature 1: JP H8-128901 A
Patent Literature 2: JP 6606308 B2

SUMMARY OF INVENTION

Technical Problem

The temperature sensors disclosed in Patent Literature 1 and Patent Literature 2 realize thickness reduction at a certain level. For example, according to Patent Literature 1, the temperature sensor having a thickness of 2 mm or less is realized. Depending on the temperature measurement target, however, the temperature sensor reduced in thickness at such a level cannot cope with the temperature measurement target. Further, a work of manufacturing the temperature sensor reduced in thickness is not easy in some cases.

Accordingly, an object of the present invention is to provide a temperature sensor that is reduced in thickness and is easily manufactured.

Solution to Problem

A temperature sensor according to the present invention includes a first supporting film made of an electric insulation material, a second supporting film made of an electric insulation material, and a sensor element provided between the first supporting film and the second supporting film.

The sensor element according to the present invention includes a thermosensitive body having electric characteristics that change with temperature, and a lead pattern that is provided on the first supporting film or the second supporting film and is electrically connected to the thermosensitive body.

The first supporting film and the second supporting film according to the present invention are disposed to face each other in a region where the thermosensitive body is provided.

The lead pattern according to the present invention preferably includes a first lead pattern and a second lead pattern, and the first lead pattern and the second lead pattern are bonded on a same plane of the first supporting film facing the second supporting film.

In the present invention, preferably, the second supporting film includes a third conductive pad on a surface facing the region where the thermosensitive body is provided. The first lead pattern and the second lead pattern are electrically connected through the third conductive pad electrically connected to the thermosensitive body.

In the present invention, preferably, the first supporting film includes a first conductive pad that supports the thermosensitive body and is electrically connected to the first lead pattern, and a second conductive pad electrically connected to the second lead pattern.

In the present invention, preferably, the first lead pattern and the second lead pattern are electrically connected when the third conductive pad is electrically connected to the first conductive pad and the second conductive pad.

In the present invention, preferably, the thermosensitive body includes a pair of electrodes, and one of the pair of electrodes is disposed to face the first conductive pad, and the other of the pair of electrodes is disposed to face the third conductive pad.

In the present invention, preferably, the first conductive pad and the second conductive pad are arranged with an interval in a length direction (L) of the first supporting film, and the first conductive pad is disposed closer to an end in the length direction (L) than the second conductive pad.

In the present invention, preferably, the first conductive pad and the second conductive pad are disposed at a center of the first supporting film in a width direction (W).

In the present invention, the first supporting film and the second supporting film are preferably separately provided, or are preferably configured by folding one supporting film at a predetermined position.

In the present invention, electric connection between the thermosensitive body and one or both of the first conductive pad and the third conductive pad is preferably performed through an electric joint body that uses an anisotropic conductive paste or an anisotropic conductive film as a starting material.

In the present invention, the first supporting film and the second supporting film are each preferably configured by a flexible printed circuit, and a coverlay is not provided in a region where the second conductive pad is disposed.

A method of manufacturing a temperature sensor according to the present invention includes: a step (a) of stacking a first supporting film that is made of an electric insulation material and has one surface bonded with a sensor element, and a second supporting film that is made of an electric insulation material, in a state where the one surface faces the second supporting film; and a step (b) of joining the first supporting film and the second supporting film.

The sensor element according to the present invention includes a thermosensitive body having electric characteristics that change with temperature, and a first lead pattern and a second lead pattern that are electrically connected to the thermosensitive body.

In the step (a) according to the present invention, the second supporting film smaller in plane area than the first supporting film is stacked to cover a part of the first supporting film including a region where the thermosensitive body is provided.

In the method of manufacturing the temperature sensor according to the present invention, preferably, the second supporting film includes a third conductive pad on a surface facing the region where the thermosensitive body is provided. In the step (a) according to the present invention, the first lead pattern and the second lead pattern are electrically connected through the third conductive pad electrically connected to the thermosensitive body.

In the method of manufacturing the temperature sensor according to the present invention, the first supporting film includes a first conductive pad that supports the thermosensitive body and is electrically connected to the first lead pattern, and a second conductive pad electrically connected to the second lead pattern. In the present invention, in the step (a), the first lead pattern and the second lead pattern are electrically connected when the third conductive pad is electrically connected to the first conductive pad and the second conductive pad 15.

Advantageous Effects of Invention

The temperature sensor according to the present invention includes the first supporting film made of an electric insulation material, the second supporting film that is made of an electric insulation material and is stacked on the first supporting film, and the sensor element provided between the first supporting film and the second supporting film. Therefore, the temperature sensor can be reduced in thickness. In addition, the first supporting film and the second supporting film are disposed to face each other in the region where the thermosensitive body is provided, and the second supporting film only covers a part of the first supporting film. Therefore, the second supporting film is easily bonded to the first supporting film.

BRIEF DESCRIPTION OF DRAWINGS

FIG. 1A is a plan view of a temperature sensor according to a first embodiment of the present invention, and FIG. 1B is a bottom view thereof.

FIG. 14 is a cross-sectional view illustrating a temperature sensor according to a fifth embodiment of the present invention, corresponding to FIG. 10.

DESCRIPTION OF EMBODIMENTS

Figure 2A:
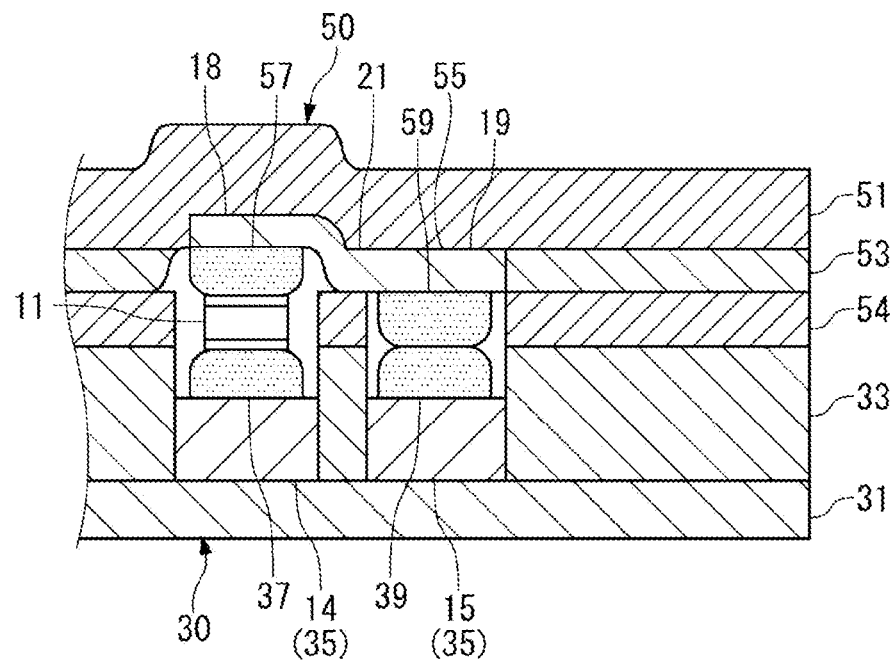
FIG. 2A is a cross-sectional view taken along line IIa-IIa in FIG. 1A.

Some embodiments of the present invention are described below with reference to accompanying drawings.

First Embodiment: FIGS. 1A to 6B Entire Configuration

A temperature sensor 1 according to a first embodiment is described with reference to FIG. 1A to FIG. 6B.

As illustrated in FIGS. 1A, 1B, the temperature sensor 1 includes a sensor element 10, a first supporting film 30, and a second supporting film 50 that is stacked by being bonded to the first supporting film 30. In the following description, a case in which each of the first supporting film 30 and the second supporting film 50 has a rectangular shape in a planar view, and a plane area of the second supporting film 50 is set less than a plane area of the first supporting film 30 is described as an example. Therefore, the second supporting film 50 covers only a front portion of the first supporting film 30 including a region where a thermosensitive body 11 is provided.

As illustrated in FIGS. 1A, 1B, in the temperature sensor 1, a side on which the thermosensitive body 11 of the sensor element 10 is provided is defined as a front side (F), and a side opposite to the front side (F) is defined as a rear side (B). The front side (F) is also referred to as a forward side (F), a front end (F), or the like in some cases. This is true of the rear side (B).

In addition, in the temperature sensor 1, a width direction (W) and a length direction (L) are defined as illustrated in FIGS. 1A, 1B.

Further, in the temperature sensor 1, a side on which the second supporting film 50 is provided is defined as a front surface side, and a side opposite thereto is defined as a rear surface side.

Sensor Element 10: FIGS. 1A to 3B

A main part of the sensor element 10 is provided between the first supporting film 30 and the second supporting film 50 as described below.

As illustrated in FIG. 1A to FIG. 3B, the sensor element 10 includes a first conductive pad 14 made of a copper foil, the thermosensitive body 11 including, as a component, a thermistor electrically connected to the first conductive pad 14, and a first lead pattern 12 electrically connected to the thermosensitive body 11. The sensor element 10 further includes a second conductive pad 15 made of a copper foil, and a second lead pattern 16 electrically connected to the second conductive pad 15.

As illustrated in FIGS. 1A, 1B, the thermosensitive body 11 and the first conductive pad 14 are disposed near the front end (F) of the temperature sensor 1 at a center in the width direction (W). The second conductive pad 15 is disposed closer to the rear end (B) than the thermosensitive body 11 at the center in the width direction (W). In other words, the thermosensitive body 11 (first conductive pad 14) and the second conductive pad 15 have an interval in the length direction (L), and are disposed side by side at positions dividing the temperature sensor 1 in the width direction (W), in order of the thermosensitive body 11 and the second conductive pad 15 from the front end (F) side. The arrangement in which the thermosensitive body 11 is closer to the front end (F) than the second conductive pad 15 is one requirement for effects achieved by the temperature sensor 1.

As illustrated in FIGS. 1A, 1B, the first lead pattern 12 is drawn out from the thermosensitive body 11 (first conductive pad 14) toward one side (right side in FIG. 1A) in the width direction (W), and then straightly extends toward the rear end (B), thereby forming an L-shape in a planar view. A first terminal pad 13 is electrically connected to the rear end (B) side of the first lead pattern 12. The first terminal pad 13 has a width wider than a width of the first lead pattern 12, and is connected to an external terminal and the like.

The second lead pattern 16 is drawn out from the second conductive pad 15 toward the other side (left side in FIG. 1A) in the width direction (W), and then straightly extends toward the rear end (B), thereby forming an L-shape in a planar view. A second terminal pad 17 is electrically connected to the rear end (B) side of the second lead pattern 16.

The second terminal pad 17 has a width wider than a width of the second lead pattern 16, and is connected to an external terminal and the like.

As an example, the first lead pattern 12 and the second lead pattern 16 have the same width and are laid in parallel with each other. Each of the first lead pattern 12 and the second lead pattern 16 is made of an electroconductive material formed on the first supporting film 30, for example, a copper alloy foil. Each of the first supporting film 30 and the second supporting film 50 is configured by a so-called single-sided FPC (flexible printed circuits), and the first lead pattern 12, the first terminal pad 13, the second lead pattern 16, and the second terminal pad 17 correspond to a circuit portion of the FPC.

The first lead pattern 12 and the second lead pattern 16 are embedded in the first supporting film 30 in a thickness direction without being exposed to outside. In contrast, the first terminal pad 13 and the second terminal pad 17 respectively connected to the first lead pattern 12 and the second lead pattern 16 are released on the front surface side through connection windows 47 and 48 provided near the rear end (B) of the first supporting film 30.

The sensor element 10 includes a third-A conductive pad 18, a third-B conductive pad 19, and a third-C conductive pad 21 that electrically connect the thermosensitive body 11 (first conductive pad 14) and the second conductive pad 15. The third-A conductive pad 18 is provided at a position corresponding to the thermosensitive body 11 and the first conductive pad 14. The thermosensitive body 11 is sandwiched between the second lead pattern 16 and the third-A conductive pad 18, and the second lead pattern 16 and the third-A conductive pad 18 are electrically connected. The third-B conductive pad 19 is provided at a position corresponding to the second conductive pad 15, and the second conductive pad 15 is electrically connected to the third conductive pad 19. The third-A conductive pad 18 and the third-B conductive pad 19 are electrically connected by the third-C conductive pad 21. The third-A conductive pad 18, the third-B conductive pad 19, and the third-C conductive pad 21 are integrally formed, and are bonded to the second supporting film 50.

Figure 2B:
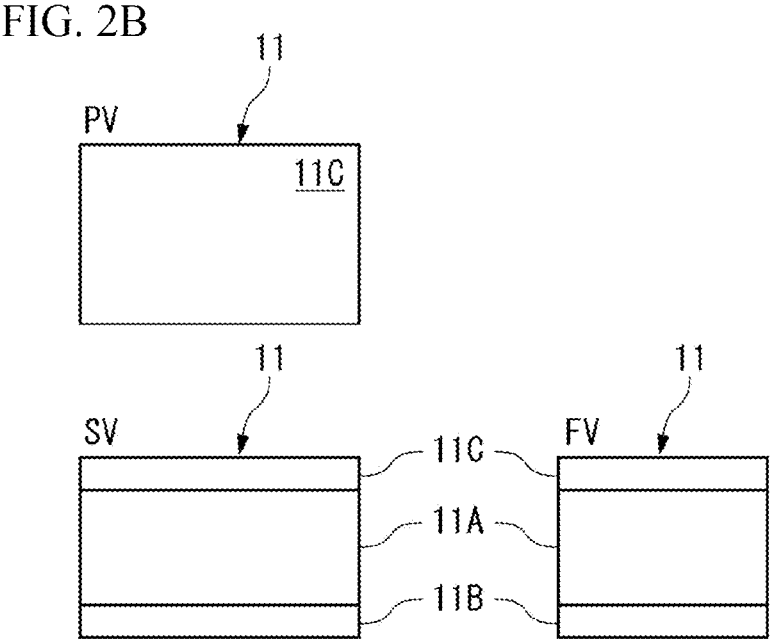
FIG. 2B is a three-view diagram of a thermistor including a plan view (PV), a side view (SV), and a front view (FV).

As illustrated in FIG. 2B, the thermosensitive body 11 includes a thermistor 11A, a first electrode 11B provided on a surface on one side of the thermistor 11A, and a second electrode 11C provided on a surface on the other side of the thermistor 11A. As an example, the thermosensitive body 11 is disposed such that the first electrode 11B faces the first conductive pad 14, and the second electrode 11C faces the third-A conductive pad 18. In other words, the first electrode 11B and the second electrode 11C of the thermosensitive body 11 are disposed along front and rear surfaces of the temperature sensor 1. The first lead pattern 12 and the second lead pattern 16 of the temperature sensor 1 are formed on the same plane irrespective of the arrangement of the thermosensitive body 11.

The thermistor 11A has characteristics that electric resistance changes largely with respect to temperature change. As the thermistor, there are an NTC (negative temperature coefficient) thermistor in which a resistance value is decreased as the temperature is increased, and a PTC (positive temperature coefficient) thermistor in which a resistance value is fixed up to a certain temperature, and the resistance value is abruptly increased when the temperature exceeds the certain temperature. Any of the NTC thermistor and the PTC thermistor is adoptable as the thermistor 11A according to the present embodiment.

Each of the first electrode 11B and the second electrode 11C is made of gold, silver, copper, platinum, or the like, and is formed on the front and rear surfaces of the thermistor 11A by means such as vapor deposition.

For example, the thermistor 11A according to the present embodiment has dimensions within a range of 0.05 mm to 0.1 mm in the width direction (W), the length direction (L), and the thickness direction. The thermosensitive body 11 does not include a protective layer such as glass protecting the thermistor 11A, the first electrode 11B, and the second electrode 11C from surroundings. Therefore, the dimensions of the thermosensitive body 11 can be reduced.

Figure 3A:
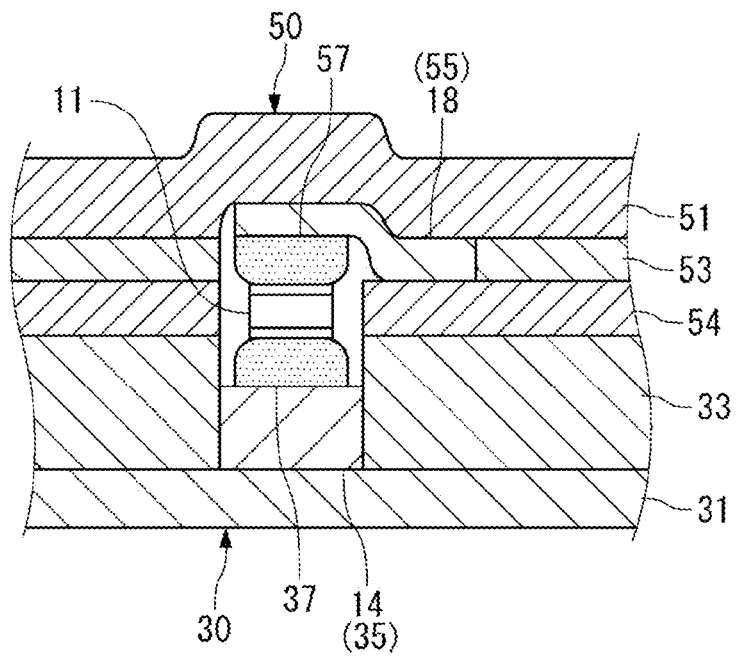
FIG. 3A is a cross-sectional view taken along line IIIa-IIIa in FIG. 1.
Figure 3B:
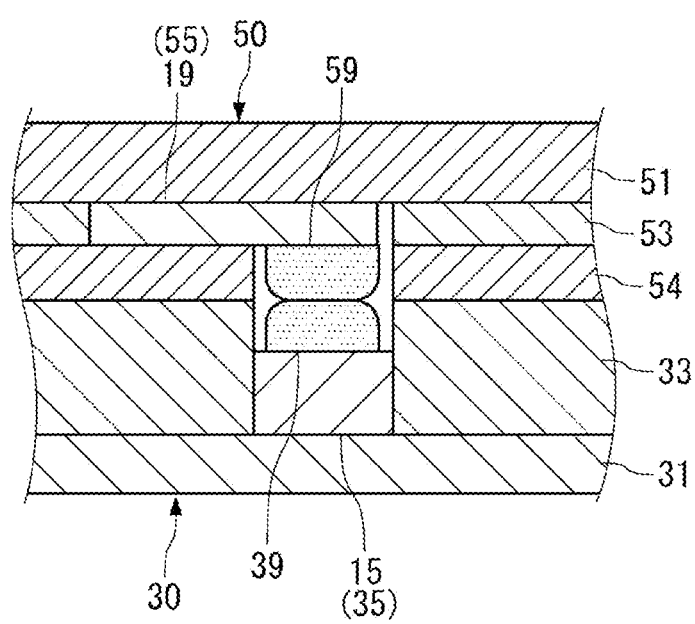
FIG. 3B is a cross-sectional view taken along line IIIb-IIIb in FIG. 1A.

First Supporting Film 30: FIGS. 2A and 3B

Next, the first supporting film 30 provided on the rear surface side of the temperature sensor 1 is described.

The first supporting film 30 is an element supporting the sensor element 10, and is configured by an FPC as an example. As illustrated in FIG. 2A and FIGS. 3A and 3B, the FPC includes a base 31, a cover 33 provided to face the base 31, and an electroconductive pattern 35 that is provided at a portion where the cover 33 is cut off on a front surface of the base 31. The first lead pattern 12, the first terminal pad 13, the first conductive pad 14, the second conductive pad 15, the second lead pattern 16, and the second terminal pad 17 as the components of the sensor element 10 are configured by the electroconductive pattern 35. In other words, the first lead pattern 12 and the second lead pattern 16 are provided on the same plane on the front surface side of the base 31. Shapes and thicknesses of the cover 33, the cover 33, and the electroconductive pattern 35 in FIG. 2A, FIGS. 3A and 3B, and other drawings do not reflect actual shapes and actual thicknesses. Further, in the present embodiment, a film is a member sufficiently thin to an area. In the FPC, the thickness of each of the base 31 and the electroconductive pattern 35 is, for example, 50 μm or less, preferably 30 μm, and more preferably 20 μm or less. Further, the film in the present embodiment is not directly linked to rigidity thereof. In other words, when the film has a cantilever structure, the rigidity includes a degree at which the film is bent at a supported part without keeping a flat original form due to dead weight, and a degree at which the film can keep a flat state.

The base 31 and the cover 33 are each made of an electric insulation material such as polyimide, and the electroconductive pattern 35 is made of a copper foil. A process of manufacturing the FPC is well-known. Therefore, description thereof is omitted. Note that joint layers by an adhesive are provided between the base 31 and the electroconductive pattern 35 and between the cover 33 and the electroconductive pattern 35 in some cases; however, illustrations of the joint layers are omitted in FIG. 2A and FIGS. 3A and 3B.

Second Supporting Film 50: FIGS. 2A, 2B and 3A, 3B

Next, the second supporting film 50 provided on the front surface side of the temperature sensor 1 is described.

The second supporting film 50 is a component electrically connecting the thermosensitive body 11 and the second conductive pad 15.

As an example, the second supporting film 50 is configured by the FPC as with the first supporting film 30. As illustrated in FIG. 2A and FIGS. 3A and 3B, the second supporting film 50 includes a base 51, a cover 53 provided to face the base 51, and an electroconductive pattern 55. The electroconductive pattern 55 in the second supporting film 50 is electrically connected to the thermosensitive body 11, and is electrically connected to the second conductive pad 15 as well. The electroconductive pattern 55 is provided over the base 51 and the cover 53.

The third-A conductive pad 18, the third-B conductive pad 19, and the third-C conductive pad 21 as the components of the sensor element 10 are configured by the electroconductive pattern 55. Therefore, the third-A conductive pad 18, the third-B conductive pad 19, and the third-C conductive pad 21 are bonded on the same plane of the second supporting film 50 facing the first supporting film 30.

The first supporting film 30 and the second supporting film 50 are bonded by a double-sided tape 54 as an example.

Electric Connection Relationship: FIGS. 2A, 2B and 3A, 3B

As illustrated in FIGS. 2A and 3A, an electroconductive joint body 37 is provided between the thermosensitive body 11 and the first conductive pad 14, and an electroconductive joint body 57 is provided between the thermosensitive body 11 and the electroconductive pattern 55. Further, as illustrated in FIGS. 2A and 3B, an electroconductive joint body 39 and an electroconductive joint body 59 are provided between the second conductive pad 15 and the electroconductive pattern 55. As a result, an electric circuit of the sensor element 10 is configured by the first lead pattern 12, the thermosensitive body 11, and the second lead pattern 16. In other words, in the sensor element 10, the first lead pattern 12, the third-B conductive pad 19, the third-C conductive pad 21, the third-A conductive pad 18, the thermosensitive body 11, the first conductive pad 14, the second conductive pad 15, and the second lead pattern 16 are electrically connected in order. The electric circuit is necessary to form the first lead pattern 12 and the second lead pattern 16 of the temperature sensor 1 on the same plane even though the first electrode 11B and the second electrode 11C of the thermosensitive body 11 are disposed along the front and rear surfaces of the temperature sensor 1.

Materials used for the joint bodies 57 and 59, and the like are optional, and for example, an electroconductive adhesive is selected. As the electroconductive adhesive, a material in which electroconductive filler is dispersed into a binder resin such as epoxy and urethane, and the filler forms an electroconductive path after bonding to achieve electroconductive joining is widely adopted. As the electroconductive filler, powder of a metal such as copper, nickel, and silver, and a carbon material such as graphite and CNT (carbon nanotube) are usable. Further, solder having electroconductivity and a joining function is usable, or an anisotropic conductive paste, an anisotropic conductive film, or the like is usable as described below. Further, these materials are usable in combination.

Method of Manufacturing Temperature Sensor 1: FIGS. 4A to 6B

Next, a procedure of manufacturing the temperature sensor 1 is described with reference to FIG. 4A to FIG. 6B.

First, the first supporting film 30 is described with reference to FIGS. 4A, 4B.

Figure 4A:
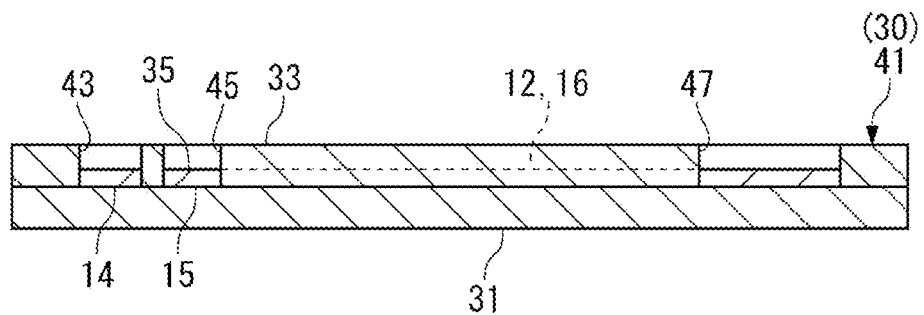
FIGS. 4A-4C are a diagram illustrating steps of manufacturing a first supporting film in a procedure of manufacturing the temperature sensor according to the first embodiment.

As illustrated in FIG. 4A, a first FPC 41 that is a starting material of the first supporting film 30 is prepared. Housing holes 43 and 45 for the thermosensitive body 11 and the joint bodies 37 and 39 are already formed in the first FPC 41. The housing holes 43 and 45 are formed by etching the cover 33. The first conductive pad 14 and the second conductive pad 15 are respectively formed in the housing holes 43 and 45. Note that, in the first FPC 41, the components same as the components of the first supporting film 30 are denoted by the same reference numerals as in the first supporting film 30, and descriptions of the components are omitted.

Figure 4B:
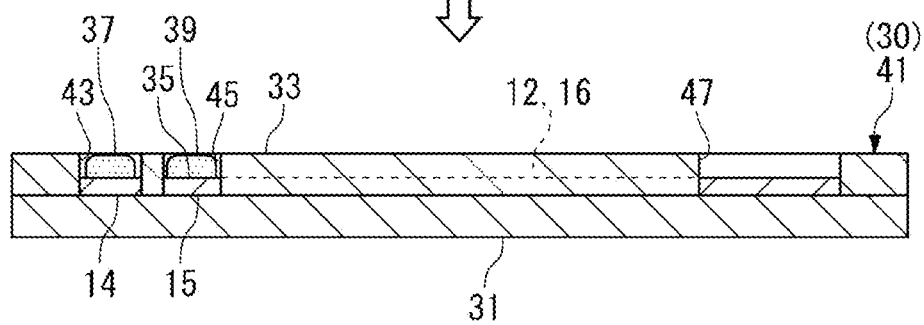

As illustrated in FIG. 4B, the joint bodies 37 and 39 are respectively applied to the housing holes 43 and 45 of the first FPC 41. The joint bodies 37 and 39 are electrically connected to the surfaces of the first conductive pad 14 and the second conductive pad 15 in the housing holes 43 and 45, respectively.

Figure 4C:
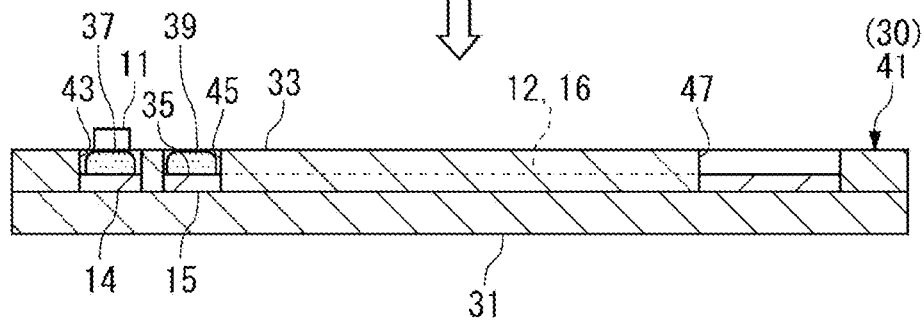

Next, as illustrated in FIG. 4C, the thermosensitive body 11 is placed on a top of the joint body 37 disposed in the housing hole 43. One of the first electrode 11B and the second electrode 11C both not illustrated, of the thermosensitive body 11 is in contact with the joint body 37.

Up to this point, the first FPC 41 is prepared to be bonded to an FPC 61 that is a starting material of the second supporting film 50.

Next, the second supporting film 50 is described with reference to FIGS. 5A, 5B.

Figure 5A:
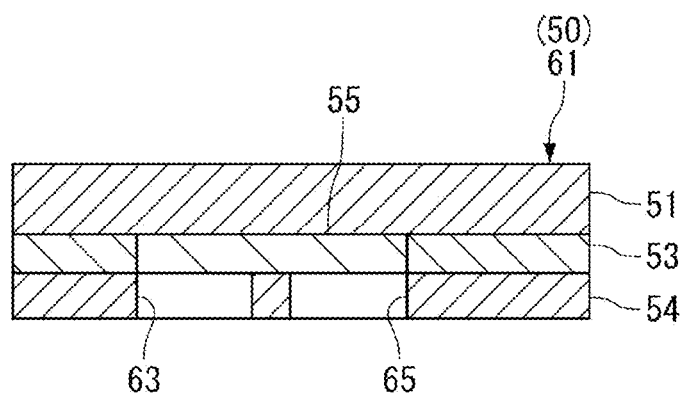
FIGS. 5A and 5B are a diagram illustrating steps of manufacturing a second supporting film in the procedure of manufacturing the temperature sensor according to the first embodiment.

As illustrated in FIG. 5A, the second FPC 61 that is the starting material of the second supporting film 50 is prepared. Housing holes 63 and 65 for disposing the joint bodies 57 and 59 are already formed in the second FPC 61. The housing holes 63 and 65 are formed by performing laser processing on the cover 53 as an example. Note that, in the second FPC 61, the components same as the components of the second supporting film 50 are denoted by the same reference numerals as in the second supporting film 50, and descriptions of the components are omitted.

Figure 5B:
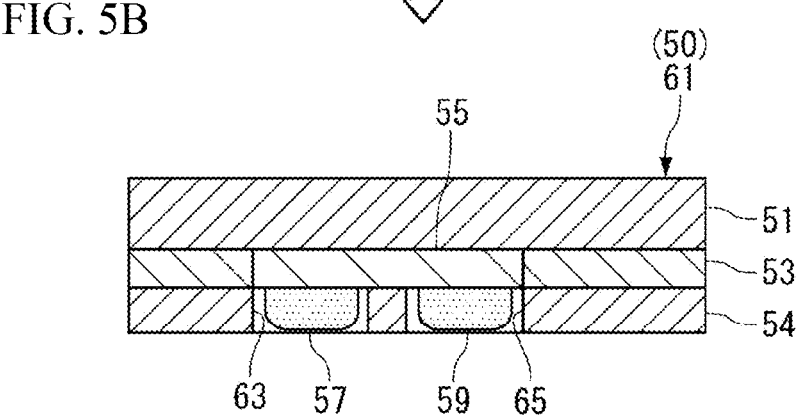

As illustrated in FIG. 5B, the joint bodies 57 and 59 are respectively applied to the housing holes 63 and 65 of the second FPC 61. The joint bodies 57 and 59 are electrically connected to the surface of the third-B conductive pad 19 in the housing holes 63 and 65.

Up to this point, the second FPC 61 is prepared to be bonded to the first FPC 41.

Figure 6A:
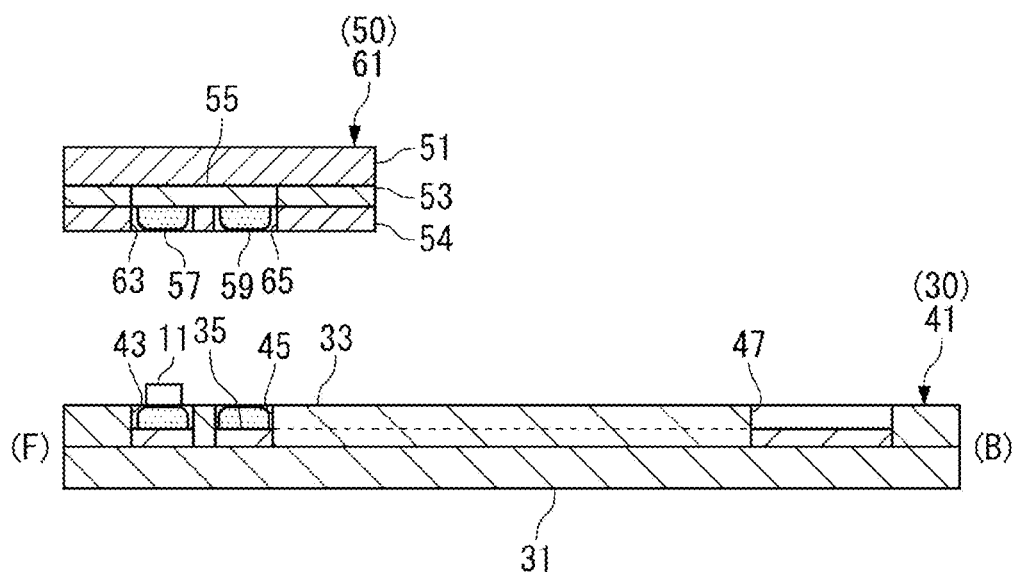
FIGS. 6A and 6B are a diagram illustrating steps of bonding the first supporting film and the second supporting film in the procedure of manufacturing the temperature sensor according to the first embodiment.

Next, as illustrated in FIG. 6A, the first FPC 41 and the second FPC 61 are aligned. The alignment indicates that the joint bodies 37 and 39 of the first FPC 41 and the joint bodies 57 and 59 of the second FPC 61 are placed at the same positions in a horizontal direction H.

Figure 6B:
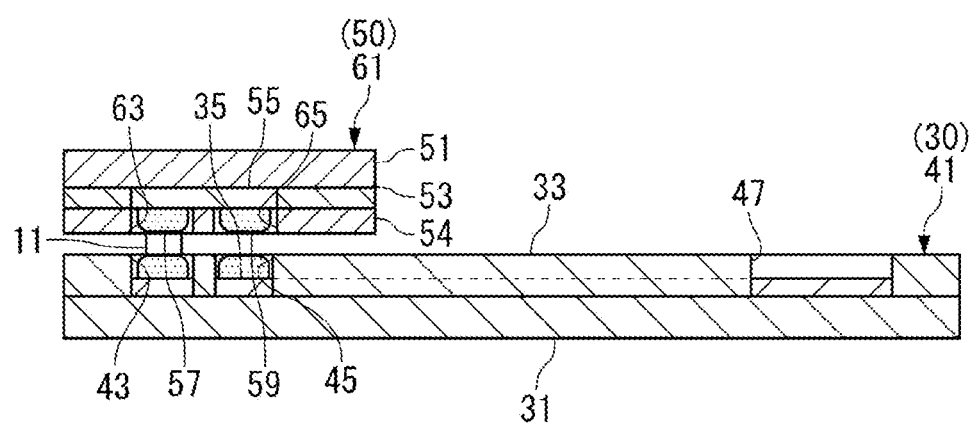

After the first FPC 41 and the second FPC 61 are aligned, the first FPC 41 and the second FPC 61 are overlaid. At this time, as illustrated in FIG. 6B, the joint body 59 and the thermosensitive body 11 come into contact with each other. In the overlaid state, the cover 33 of the first FPC 41 and the cover 53 of the second FPC 61 are joined. The joining is performed by means selected from thermocompression in which pressurization is performed with heating, a double-sided tape, and the like.

By the above-described procedure, the temperature sensor 1 is obtained.

Effects Achieved by First Embodiment

Next, effects achieved by the temperature sensor 1 are described.

First Effect: Reduction in Thickness

In the temperature sensor 1, the entire thickness including the first supporting film 30 and the second supporting film 50 can be reduced to 0.5 mm or less, preferably 0.3 mm or less because the thermosensitive body 11 does not include a protective layer such as glass, and the technique of the FPC is usable.

Second Effect: Bonding Range

In the temperature sensor 1, the first supporting film 30 and the second supporting film 50 are bonded to each other; however, the second supporting film 50 covers only a part of the first supporting film 30, in particular, covers the first supporting film 30 in a region where the thermosensitive body 11 is electrically connected to both of the first lead pattern 12 and the second lead pattern 16.

When two films are bonded, bonding becomes difficult and a possibility of defects such as wrinkles is increased as areas of the films are increased. Further, a material cost is increased as the areas of the films are increased.

In contrast, in the temperature sensor 1, the surface area of the second supporting film 50 is small. This facilitates a work of bonding the second supporting film 50 to the first supporting film 30, and makes it possible to suppress the material cost.

Third Effect: Position of Thermosensitive Body 11

In the temperature sensor 1, the thermosensitive body 11 is provided at the position closer to the front end (F) than the second conductive pad 15. Thus, when the thermosensitive body 11 is the closest to the front end (F), in a case where a temperature measurement target is present at an inner part of a narrow space, the thermosensitive body 11 can be brought close to the measurement target by inserting the temperature sensor 1 into the space from the front end (F). This enables the temperature sensor 1 to measure a temperature of the measurement target with high accuracy.

Further, in the temperature sensor 1, the thermosensitive body 11 is disposed at the center in the width direction (W). Accordingly, when the position of the thermosensitive body 11 is aligned to a center of a heat source of the measurement target, it is possible to efficiently absorb heat from the heat source. This also enables the temperature sensor 1 to measure the temperature of the measurement target with high accuracy.

In the temperature sensor according to the present invention, however, the position of the thermosensitive body 11 is not limited thereto, and the thermosensitive body 11 can be disposed at any other position. For example, the positions of the first conductive pad 14 and the second conductive pad 15 to which the thermosensitive body 11 is electrically connected may be reversed in the length direction L, or the position of the thermosensitive body 11 may be displaced from the center in the width direction (W), based on the position of the measurement target.

Fourth Effect: Positional Relationship between First Lead Pattern 12 and Second Lead Pattern 16

In the temperature sensor 1, the first lead pattern 12 and the second lead pattern 16 are provided between the base 31 and the cover 33 of the first supporting film 30. In other words, the first lead pattern 12 and the second lead pattern 16 are provided on the same plane. As a result, it is possible to perform a work of connecting electric wires to the first terminal pad 13 and the second terminal pad 17 from one surface side of the temperature sensor 1.

The above-described electric connection relationship is adopted in order to provide the first lead pattern 12 and the second lead pattern 16 on the same plane as described above.

Figure 7A:
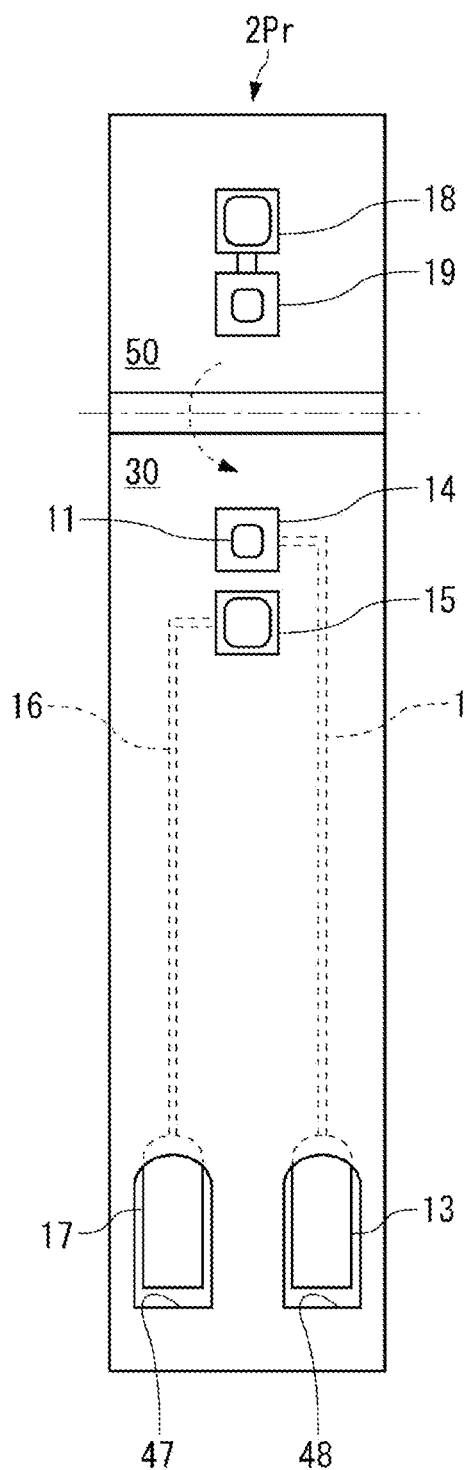
FIGS. 7A and 7B are plan views of a temperature sensor according to a second embodiment of the present invention, FIG. 7A illustrating a state where the first supporting film and the second supporting film are unfolded, and FIG. 7B illustrating a state where the second supporting film is bonded to the first supporting film.
Figure 7B:
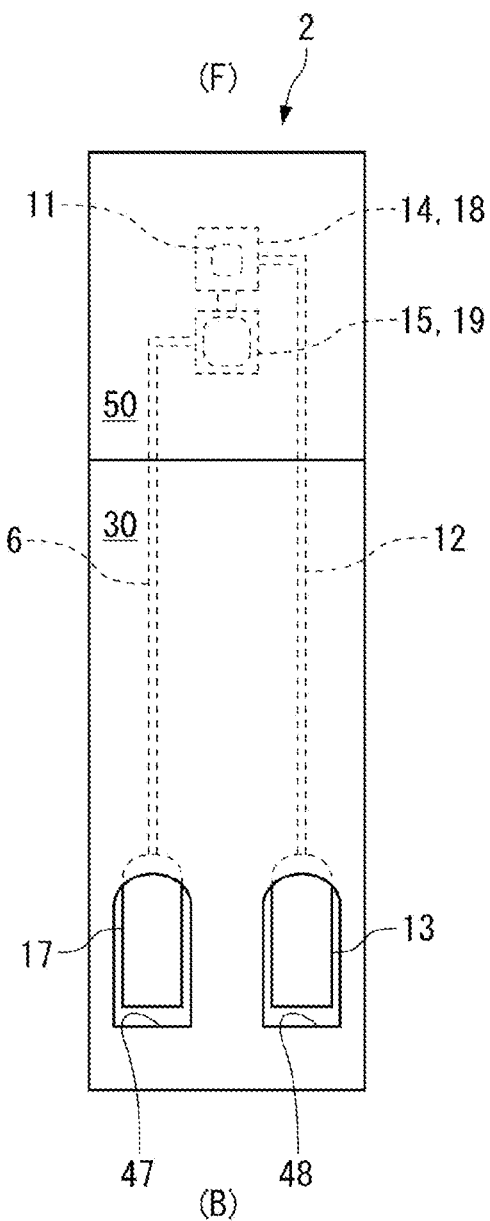

Second Embodiment: FIGS. 7A, 7B

Next, a temperature sensor 2 according to a second embodiment is described with reference to FIGS. 7A, 7B.

The temperature sensor 2 has the structure same as the structure of the temperature sensor 1, but is different in manufacturing method. More specifically, as illustrated in FIG. 7A, the temperature sensor 2 includes a supporting film 2Pr in which the first supporting film 30 and the second supporting film 50 are integrally connected. In the supporting film 2Pr, the second supporting film 50 is folded toward the first supporting film 30, and is overlaid on the first supporting film 30 as illustrated in FIG. 7B. Thereafter, the second supporting film 50 and the first supporting film 30 are bonded by any means such as the above-described thermocompression. As a result, the temperature sensor 2 having the structure same as the structure of the temperature sensor 1 can be obtained.

Effects Achieved by Second Embodiment

The temperature sensor 2 achieves the above-described first to fourth effects. In addition, for the temperature sensor 2, it is sufficient to prepare one material such as an FPC, for the first supporting film 30 and the second supporting film 50. Accordingly, as compared with the first embodiment in which the first supporting film 30 and the second supporting film 50 are separately prepared, the second embodiment contributes to cost reduction.

Figure 8:
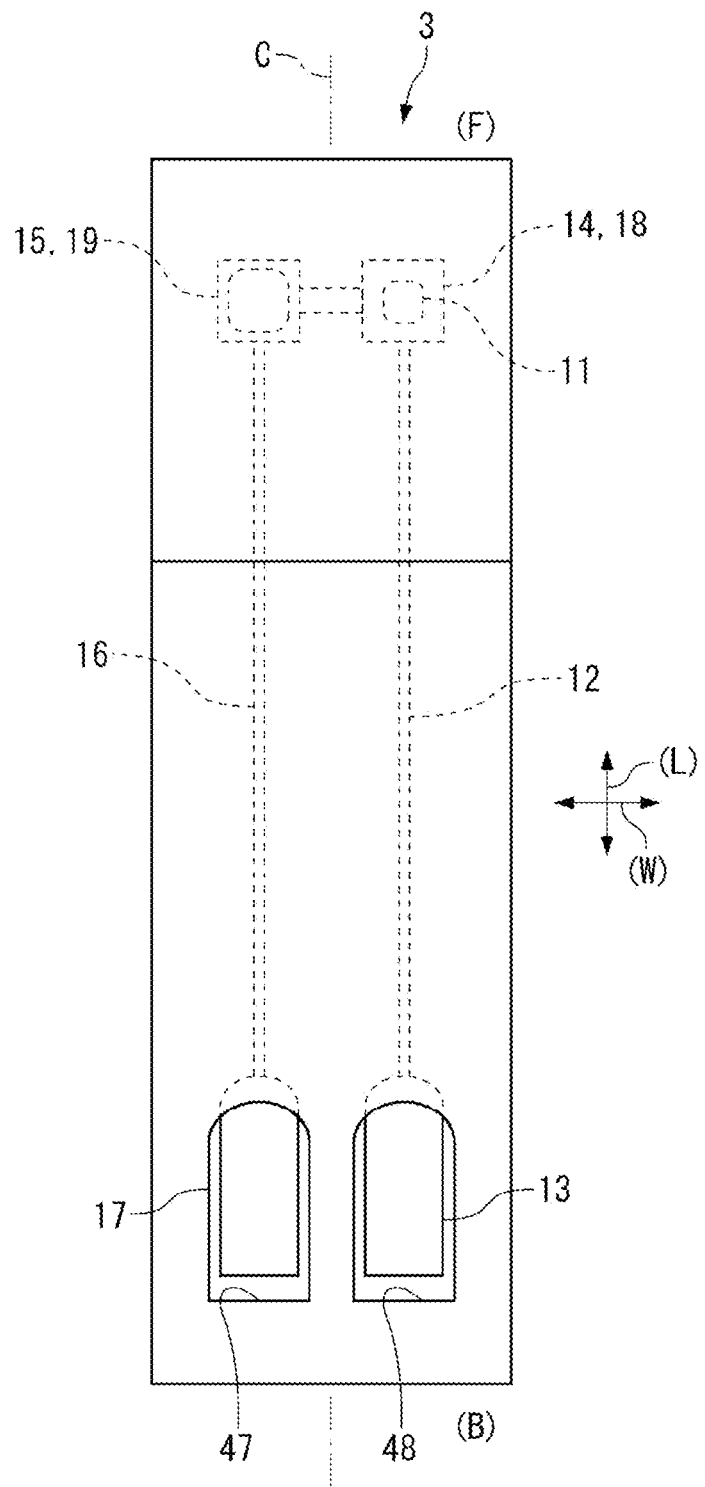
FIG. 8 is a plan view of a temperature sensor according to a third embodiment of the present invention.

Third Embodiment: FIG. 8

Next, a temperature sensor 3 according to a third embodiment is described with reference to FIG. 8.

As illustrated in FIG. 8, in the temperature sensor 3, the first conductive pad 14 and the second conductive pad 15 are disposed side by side in the width direction (W). In addition, in the temperature sensor 3, the sensor element 10 is disposed line-symmetrically about the center in the width direction (W).

The temperature sensor 3 achieves the first effect, the second effect, and the fourth effect described above. In addition, according to the temperature sensor 3, the sensor element 10 is symmetrically disposed. Therefore, the temperature sensor 3 can be easily manufactured as compared with the temperature sensor 1 in which the sensor element 10 is asymmetrically disposed.

Fourth Embodiment: FIGS. 9A to 12C

Next, a temperature sensor 4 according to a fourth embodiment is described with reference to FIG. 9A to FIG. 12C. In the temperature sensor 4, electric connection of a first supporting film 130 and a second supporting film 150 is performed by using an ACP (anisotropic conductive paste). Further, in the temperature sensor 4, members corresponding to the covers 33 and 53 illustrated in FIGS. 2A, 2B according to the first embodiment are omitted in a region (second region A2) providing electric connection without through the thermosensitive body 11.

Figure 9A:
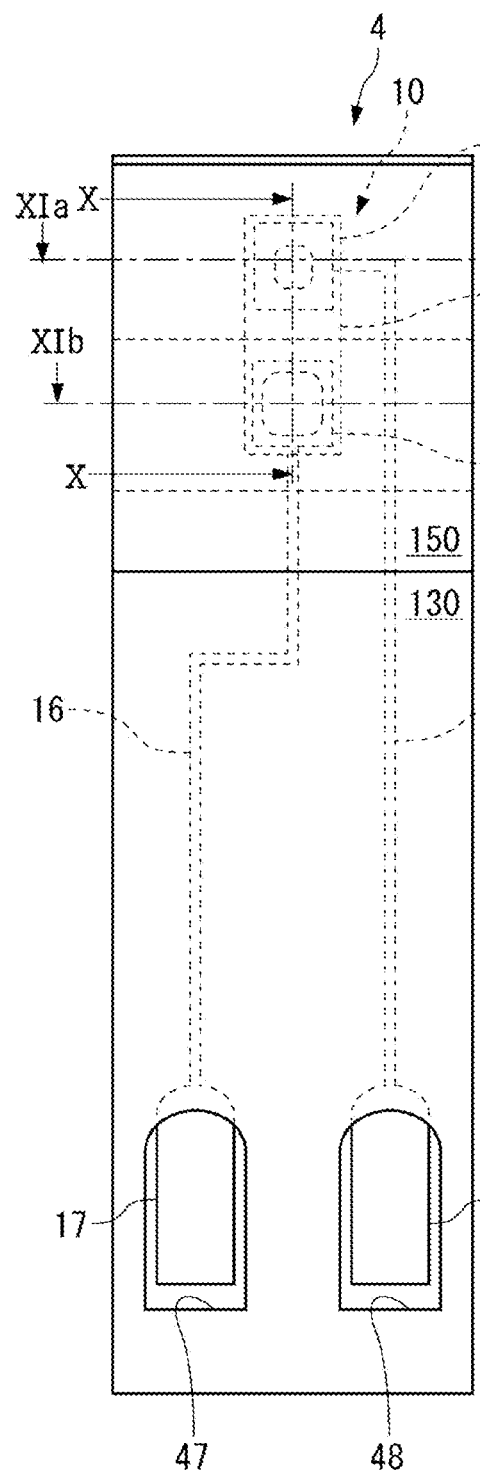
FIGS. 9A and 9B each illustrate a temperature sensor according to a fourth embodiment of the present invention, FIG. 9A being a plan view, and FIG. 9B being a bottom view.
Figure 9B:
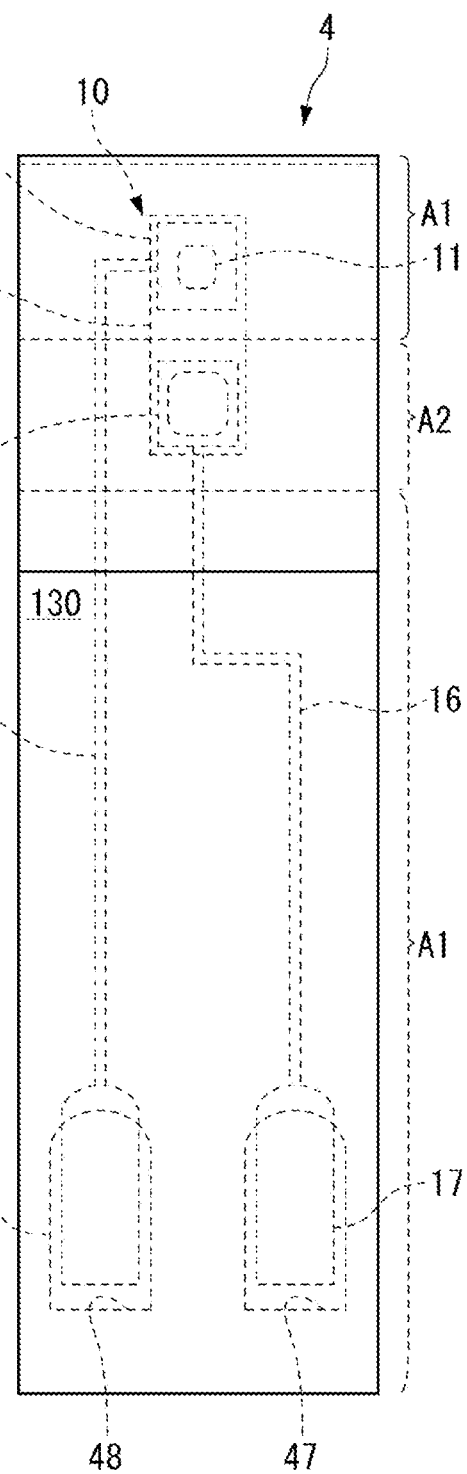

As illustrated in FIGS. 9A, 9B, a structure of the temperature sensor 4 in a planar view and a bottom view is similar to the structure of the temperature sensor 1. In the temperature sensor 4, however, specific configurations of the first supporting film 130 and the second supporting film 150 are different from the configurations of the first supporting film 30 and the second supporting film 50 of the temperature sensor 1. In particular, the first supporting film 130 is sectioned into a first region A1 provided with a cover 137 and a cover 157, and the second region A2 not provided with the cover 137 and the cover 157. The first region A1 includes a portion relating to support of the sensor element 10 and a portion not relating to support of the sensor element 10 with the second region A2 in between. The first supporting film 130 and the second supporting film 150 are described below with reference to FIG. 10.

Figure 10:
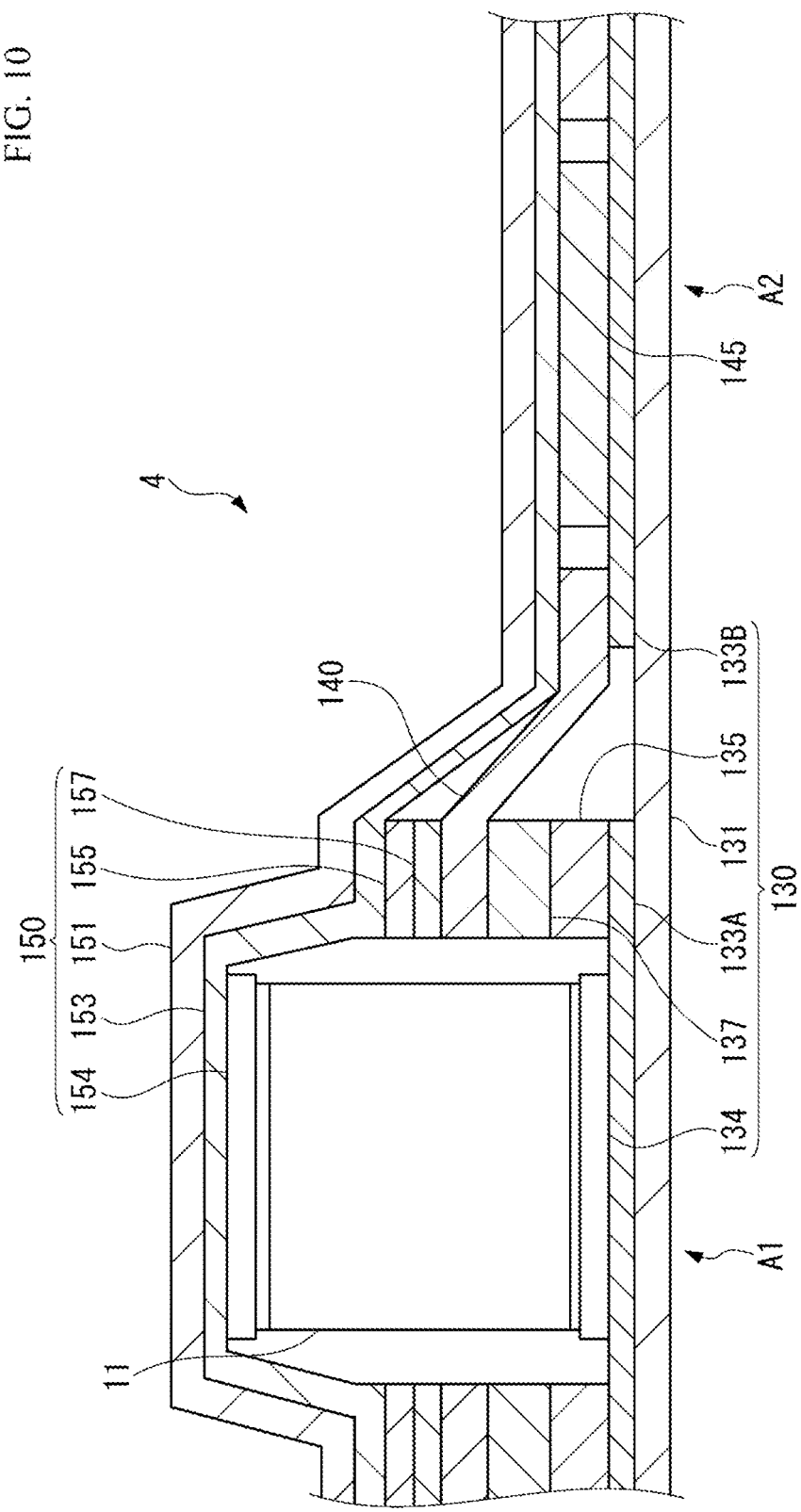
FIG. 10 is a cross-sectional view taken along line X-X in FIG. 9.
Figure 11B:
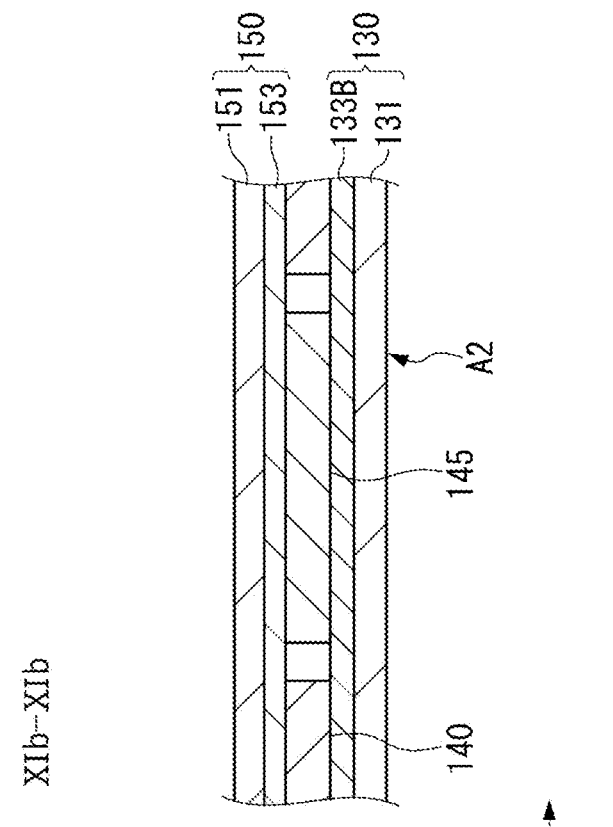
FIG. 11B is a cross-sectional view taken along line XIb-XIb in FIG. 9A.
Figure 11A:
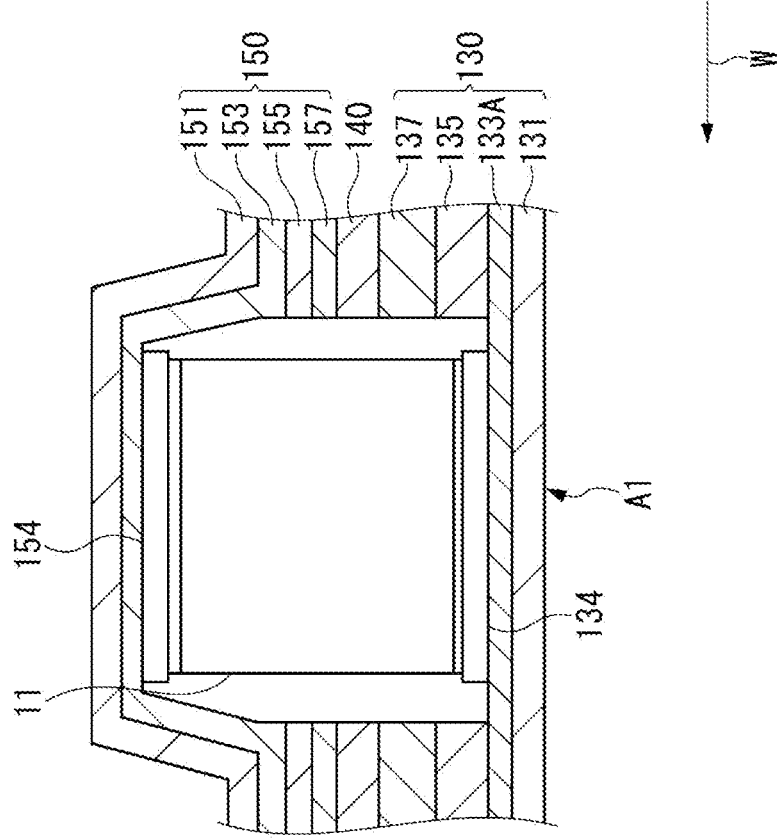
FIG. 11A is a cross-sectional view taken along line XIa-XIa in FIG. 9A.

First Supporting Film 130 (Supporting Portion for Sensor Element 10): FIGS. 10 and 11A The first supporting film 130 is an element supporting the sensor element 10, and is configured by an FPC as an example. In the first region A1, the FPC includes a base 131 and a first conductive pad 133A that is made of a copper foil and is stacked on the base 131, as illustrated in FIGS. 10 and 11A. In the first supporting film 130, the cover 137 is stacked on a surface of the first conductive pad 133A through an adhesive layer 135, thereby forming the FPC. Materials and dimensions such as thicknesses of the base 131, the first conductive pad 133A, and the cover 137 can follow the temperature sensor 1.

As illustrated in FIGS. 10 and 11A, the first supporting film 130 includes the first region A1 of the thermosensitive body 11 where the adhesive layer 135 and the cover 137 are discontinuous. In the first region A1, a joint body 134 that uses an ACP as a starting material is provided on a surface of the first conductive pad 133A. The thermosensitive body 11 is joined to a surface of the joint body 134.

In the first region A1 and the second region A2, the first supporting film 130 and the second supporting film 150 are bonded by a double-sided tape 140.

First Supporting Film 130 (Second Region A2): FIGS. 10 and 11B

In the second region A2, the first supporting film 130 includes the base 131 and a second conductive pad 133B that is made of a copper foil and is stacked on the base 131. In the second region A2, the adhesive layer 135 and the cover 137 that are provided in the first region A1 are omitted.

In the second region A2, a joint body 145 that uses an ACP as a starting material and provides electric connection with the second supporting film 150 is provided on a surface of the second conductive pad 133B.

Second Supporting Film 150 (Supporting Portion for Sensor Element 10): FIGS. 10 and 11A In the first region A1, the second supporting film 150 includes an FPC as with the first supporting film 130. As illustrated in FIGS. 10 and 11A, the second supporting film 150 includes a base 151 and a third conductive pad 153 that is made of a copper foil and is stacked on the base 151. In the second supporting film 150, the cover 157 is stacked on a surface of the third conductive pad 153 through an adhesive layer 155, thereby forming the above-described FPC. Materials and dimensions such as thicknesses of the base 151, the third conductive pad 153, and the cover 157 can follow the temperature sensor 1.

As illustrated in FIGS. 10 and 11A, the second supporting film 150 also includes the first region A1 of the thermosensitive body 11 where the adhesive layer 155 and the cover 157 are discontinuous. In the first region A1, a joint body 154 that uses an ACP as a starting material is provided on a surface of the third conductive pad 153. The thermosensitive body 11 is disposed between the joint body 154 and the joint body 134 of the first supporting film 130.

Second Supporting Film 150 (Second Region A2): FIGS. 10 and 11B

In the second region A2, the second supporting film 150 includes the base 151 and the third conductive pad 153 that is made of a copper foil and is stacked on the base 151. In the second region A2, the adhesive layer 155 and the cover 157 that are provided in the first region A1 are omitted.

In the second region A2, the joint body 145 that uses an ACP as a starting material and provides electrical connection with the first supporting film 130 is provided between the third conductive pad 153 and the second conductive pad 133B.

Electric Connection Relationship: FIGS. 9A to 11B

As illustrated in FIGS. 9A, 9B, 10, and 11A, 11B, the thermosensitive body 11 is disposed between the first conductive pad 133A and the third conductive pad 153, and is electrically connected to both of the first conductive pad 133A and the third conductive pad 153. The third conductive pad 153 is electrically connected to the second conductive pad 133B through the joint body 145. The first conductive pad 133A is electrically connected to the first lead pattern 12, and the second conductive pad 133B is electrically connected to the second lead pattern 16. As a result, in the temperature sensor 4, the electric circuit of the sensor element 10 is configured by the first lead pattern 12, the thermosensitive body 11, and the second lead pattern 16. In other words, in the sensor element 10, the first lead pattern 12, the first conductive pad 133A, the joint body 134, the thermosensitive body 11, the joint body 154, the third conductive pad 153, the joint body 145, the electroconductive pattern 145, and the second lead pattern 16 are electrically connected in order.

Method of Manufacturing Temperature Sensor 4: FIGS. 12A to 14

Next, a procedure of manufacturing the temperature sensor 4 is described with reference to FIGS. 12A to 14.

First, the first supporting film 130 is described with reference to FIGS. 12A to 12C.

Figure 12A:
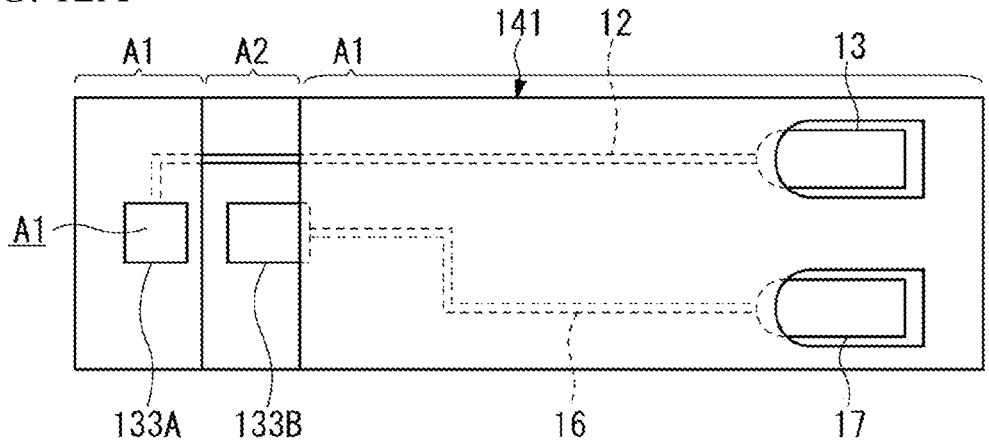
FIGS. 12A to 12C illustrate a procedure of manufacturing the temperature sensor according to the fourth embodiment, the procedure proceeding in order of FIGS. 12A, 12B, and 12C.

As illustrated in FIG. 12A, a first FPC 141 that is a starting material of the first supporting film 130 is prepared. The first lead pattern 12, the first terminal pad 13, the second lead pattern 16, the second terminal pad 17, and the first conductive pads 133A and 133B are already formed on the first FPC 141. Further, the first FPC 141 is already sectioned into the first region A1 and the second region A2. Note that, in the first FPC 141, the components same as the components of the first supporting film 130 are denoted by the same reference numerals as in the first supporting film 130, and descriptions of the components are omitted.

Figure 12B:
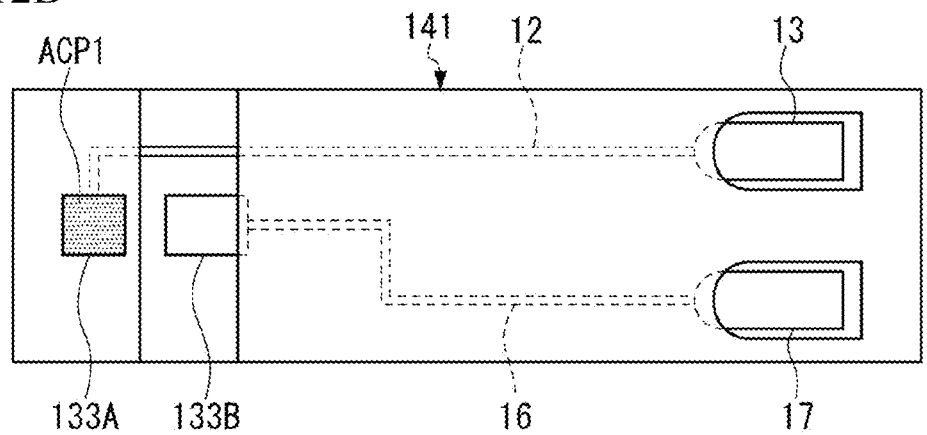

As illustrated in FIG. 12B, an anisotropic conductive paste ACP1 (hereinafter, simply referred to as ACP1) that is a starting material of the joint body 134 is applied to a predetermined position of the first conductive pad 133A included in the first FPC 141.

Figure 12C:
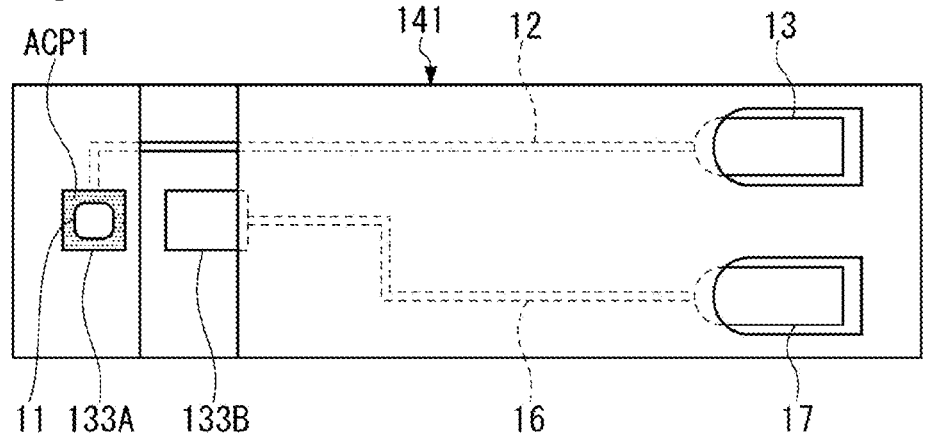

Next, as illustrated in FIG. 12C, the thermosensitive body 11 is disposed on a surface of the ACP1, and curing treatment of the ACP1 is then performed.

Figure 13A:
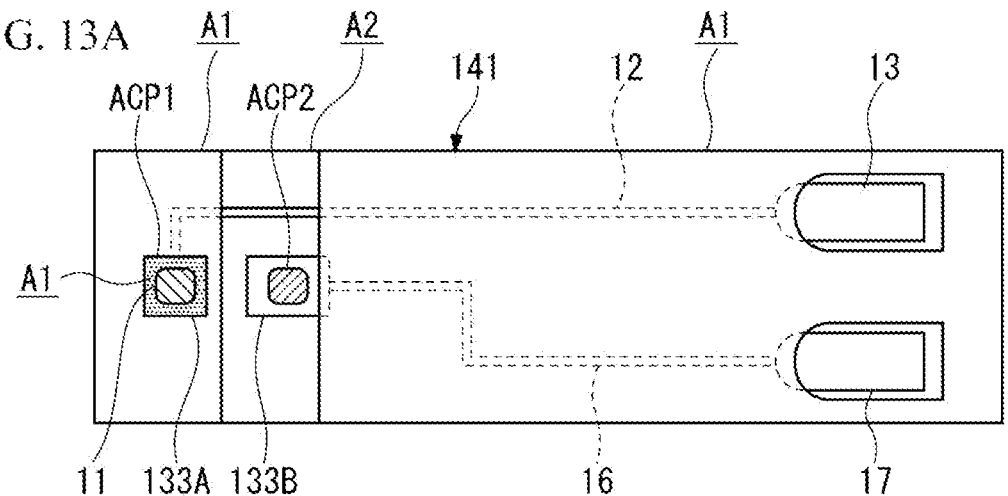
FIGS. 13A to 13C illustrate the procedure of manufacturing the temperature sensor according to the fourth embodiment subsequent to FIGS. 12A to 12C, the procedure proceeding in order of FIGS. 13A, 13B, and 13C.

Next, as illustrated in FIG. 13A, an anisotropic conductive paste ACP2 (hereinafter, simply referred to as ACP2) that is a starting material of the joint body 154 is applied to a predetermined position of the second conductive pad 133B.

Figure 13B:
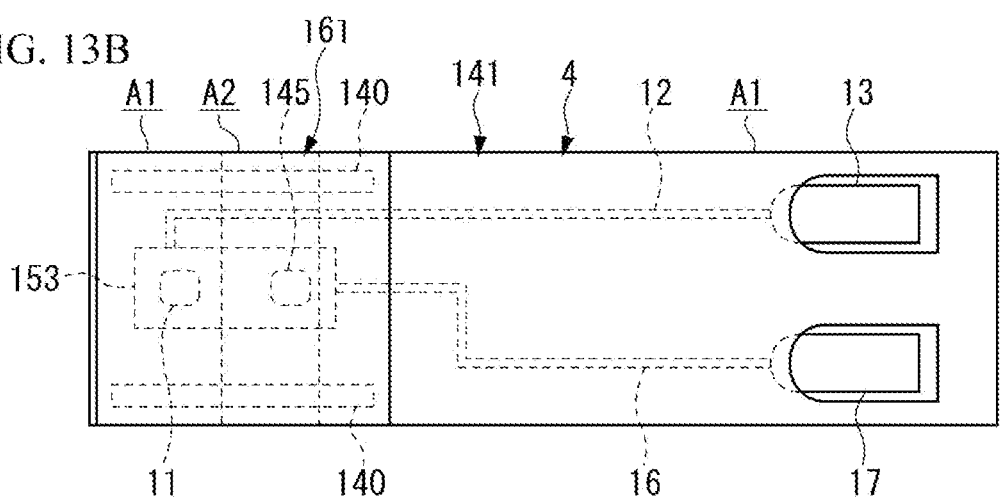

After the ACP2 is applied, a separately-prepared second FPC 161 that is a starting material of the second supporting film 150 is aligned to the first FPC 141 as illustrated in FIG. 13B and is then bonded to the first FPC 141. Thereafter, the second FPC 161 is heated and pressed. As a result, the temperature sensor 4 is obtained.

Figure 13C:
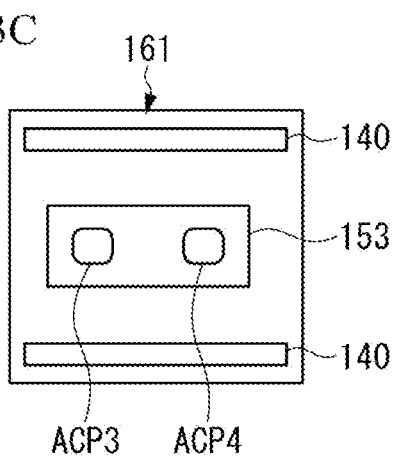

FIG. 13C illustrates the second FPC 161 that is the starting material of the second supporting film 150. FIG. 13C illustrates a surface on a side to be bonded to the second supporting film 150.

As illustrated in FIG. 13C, the second FPC 161 includes the third conductive pad 153, an ACP3 that is a starting material of the joint body 154 is applied to a position corresponding to the thermosensitive body 11, and an ACP4 that is a starting material of the joint body 145 is applied to a position corresponding to the joint body 145.

Effects by Temperature Sensor 4

The temperature sensor 4 achieves the following effects in addition to the first to fourth effects described above.

In the temperature sensor 4, the covers 137 and 157 are not provided in the second region A2. When the covers 137 and 157 are provided around the second region A2, a joining interface of the joint body 145 that uses the ACP as the starting material may be exfoliated due to repulsive force to return the covers 137 and 157 to original thicknesses after heating and pressing. Therefore, according to the temperature sensor 4, conduction of the joint body 145 that uses the ACP as the starting material is secured.

Note that, in the present embodiment, the case where the ACP is used for both of the joint body 134 and the joint body 135 that electrically connect the first supporting film 130 and the second supporting film 150 is described as an example; however, normal solder may be used for any one of the joint body 134 and the joint body 135 as long as the electric connection can be realized.

Fifth Embodiment

Next, a temperature sensor 5 according to a fifth embodiment is described with reference to FIG. 14 to FIG. 16B. The temperature sensor 5 uses an ACF (anisotropic conductive film) in place of the ACP that is used for electric connection of the first supporting film 130 and the second supporting film 150 in the temperature sensor 4 according to the fourth embodiment. Accordingly, the temperature sensor 5 is described below by focusing on the difference. Note that, in FIG. 14 to FIG. 16B, the components same as the components of the temperature sensor 4 are denoted by the same reference numerals as in FIG. 9A to FIG. 13C, and descriptions of the components are omitted.

Configuration of Temperature Sensor 5

Figure 15A:
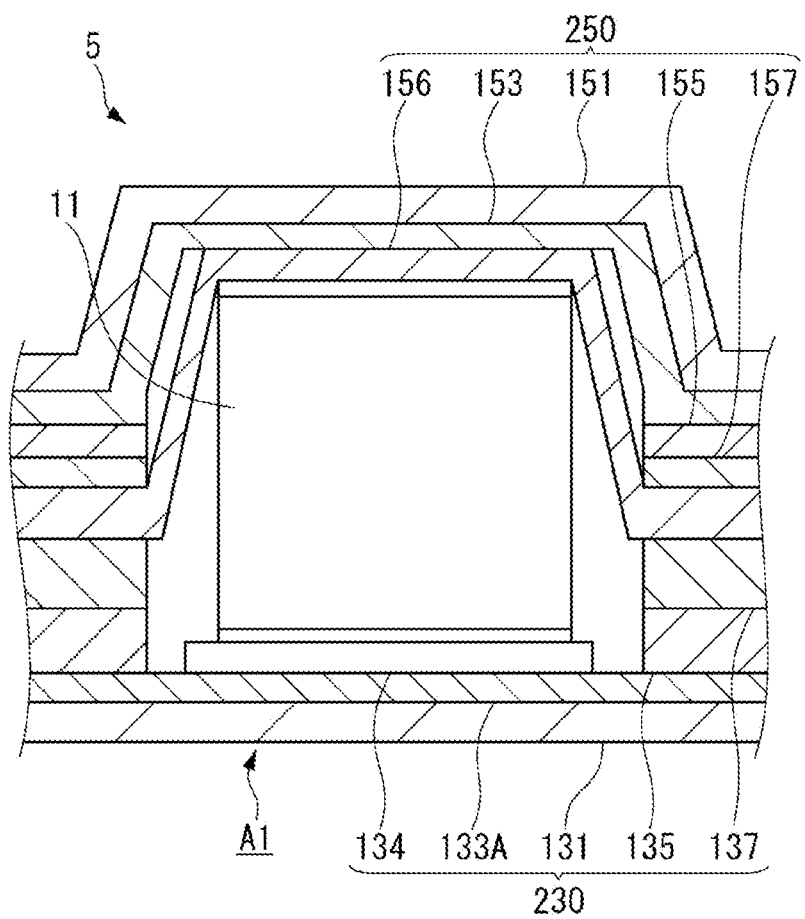
FIG. 15A is a cross-sectional view corresponding to a part of FIG. 10.
Figure 15B:
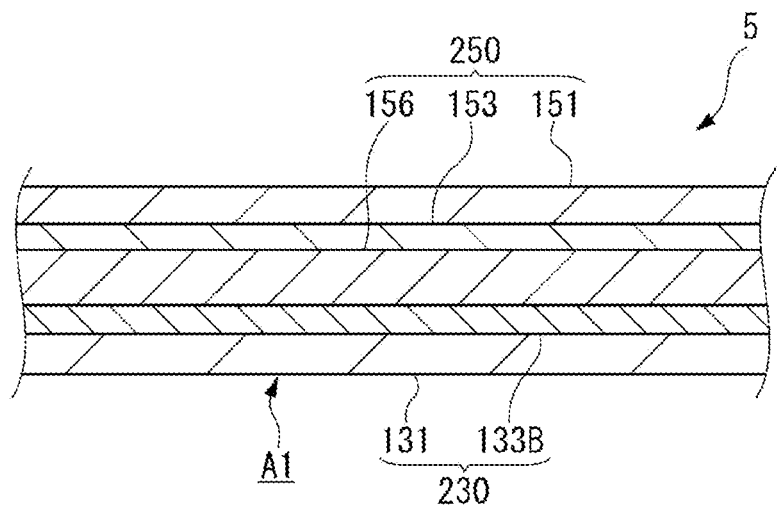
FIG. 15B is a cross-sectional view corresponding to another part of FIG. 10.

As illustrated in FIGS. 14 and 15A, in the temperature sensor 5, a joint body 156 that uses an ACP as a starting material is provided between the cover 137 and the cover 157 in the first region A1. The joint body 156 has electroconductivity. Therefore, the joint body 156 is electrically joined to the thermosensitive body 11. Further, as illustrated in FIGS. 14 and 15B, the joint body 156 extends to the second region A2, and is electrically joined to the second conductive pad 133B and the third conductive pad 153.

Accordingly, in the temperature sensor 5, the electric circuit of the sensor element 10 is configured by the first lead pattern 12, the thermosensitive body 11, and the second lead pattern 16, as with the temperature sensor 4. In other words, in the sensor element 10, the first lead pattern 12, the first conductive pad 133A, the joint body 134, the thermosensitive body 11, the joint body 154, the third conductive pad 153, the joint body 145, the second conductive pad 133B, and the second lead pattern 16 are electrically connected in order.

Figure 16A:
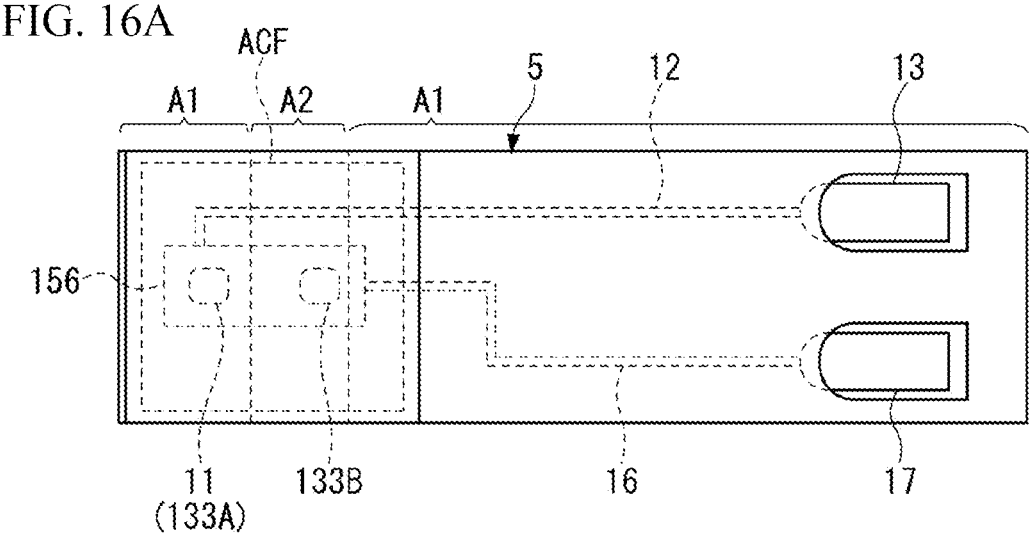
FIG. 16 is a diagram corresponding to FIG. 13C.
Figure 16B:
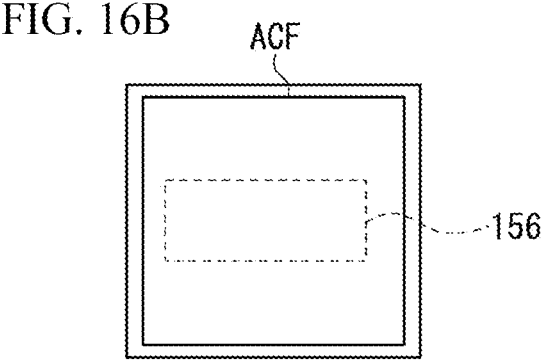

A basic method of manufacturing the temperature sensor 5 is the same as the method of manufacturing the temperature sensor 4. As illustrated in FIG. 16B, an anisotropic conductive film ACF is bonded to the second FPC 161, and the second FPC 161 is overlaid on the first FPC 141 and is heated and pressed. As a result, the temperature sensor 5 including the first supporting film 130 and the second supporting film 150 is obtained.

Effects by Temperature Sensor 5

The temperature sensor 5 achieves the following effects in addition to effects similar to the effects by the temperature sensor 4.

In the temperature sensor 5, the anisotropic conductive film ACF has a function of a double-sided tape. Therefore, the first supporting film 130 and the second supporting film 150 can be joined without providing the double-sided tape that is necessary for the temperature sensor 4.

Note that, in the present embodiment, the case where the ACF is used to electrically connect the first supporting film 130 and the second supporting film 150 is described as an example; however, normal solder may be used for any one of the joint bodies, or the ACF may be used for one of the joint bodies and the ACP may be used for the other joint body.

Although the temperature sensors according to the preferred embodiments of the present invention are described above, the configurations described in the aforementioned embodiments can be selected or appropriately modified to other configurations without departing from the spirit of the present invention, in addition to the above description.

For example, the shapes and the dimensions of the temperature sensors 1 to 3 are merely examples of the present invention. The dimension in the length direction (L) may be increased or reduced, or the dimension in the width direction (W) may be increased or reduced from the dimensions of the temperature sensors 1 to 3. This is true of the first conductive pad 14, the second conductive pad 15, and the like. For example, the planar shape of each of these pads may be formed in a shape other than a rectangular shape, for example, a circular shape. Further, the planar shape of each of the first supporting film 130 and the second supporting film 150 is not limited to a rectangular shape, and for example, one end in the length direction (L) can be protruded in an arc shape or may be recessed. The planar shape of each of the first supporting film 130 and the second supporting film 150 may be an optional shape such as a trapezoidal shape and a triangular shape.

Further, in the procedure of manufacturing the temperature sensor 1, after the thermosensitive body 11 is provided on the second starting material 61 side of the second supporting film 150, stacking and joining to the first starting material 41 of the first supporting film 130 may be performed.

Further, in the above-described embodiments, the first lead pattern 12 and the second lead pattern 16 are provided on the first supporting film 130 that has a large dimension in the length direction (L); however, the present invention is not limited thereto. The first lead pattern 12 and the second lead pattern 16 can be provided on the second supporting film 150 that has a small dimension in the length direction (L).

REFERENCE SIGNS LIST 1, 2, 3, 4, 5 Temperature sensor
10 Sensor element
11 Thermosensitive body
12 First lead pattern
13 First terminal pad
14 First conductive pad
15 Second conductive pad
16 Second lead pattern
17 Second terminal pad
18 Third-A conductive pad
19 Third-B conductive pad
21 Third-C conductive pad
130 First supporting film
47, 48 Connection window
50, 130 Second supporting film

The invention claimed is:

1. A temperature sensor, comprising:
a first supporting film made of an electric insulation material;
a second supporting film made of an electric insulation material; and
a sensor element provided between the first supporting film and the second supporting film, wherein the sensor element includes:
a thermosensitive body having electric characteristics that change with temperature, and
a lead pattern that is provided on the first supporting film and is electrically connected to the thermosensitive body, the lead pattern including a first lead pattern and a second lead pattern that are bonded on a same plane of the first supporting film,
wherein the first supporting film and the second supporting film are disposed to face each other in a region where the thermosensitive body is provided,
the first supporting film includes a first conductive pad that supports the thermosensitive body and is electrically connected to the first lead pattern, and a second conductive pad electrically connected to the second lead pattern,
the second supporting film includes a third conductive pad on a surface of the second supporting film that faces the region where the thermosensitive body is provided, and
the first lead pattern and the second lead pattern are electrically connected through the third conductive pad electrically connected to the thermosensitive body.

2. The temperature sensor according to claim 1, wherein the thermosensitive body includes a pair of electrodes, and one of the pair of electrodes is disposed to face the first conductive pad, and the other of the pair of electrodes is disposed to face the third conductive pad.

3. The temperature sensor according to claim 1, wherein the first conductive pad and the second conductive pad are arranged with an interval in a length direction of the first supporting film, and the first conductive pad is disposed closer to an end in the length direction than the second conductive pad.

4. The temperature sensor according to claim 3, wherein the first conductive pad and the second conductive pad are disposed at a center of the first supporting film in a width direction (W).

5. The temperature sensor according to claim 1, wherein the first supporting film and the second supporting film are separately provided.

6. The temperature sensor according to claim 1, wherein the first supporting film and the second supporting film are configured by folding one supporting film at a predetermined position.

7. The temperature sensor according to claim 1, wherein electric connection between the thermosensitive body and one or both of the first conductive pad and the third conductive pad is performed through an electric joint body that uses an anisotropic conductive paste or an anisotropic conductive film as a starting material.

8. The temperature sensor according to claim 1, wherein the first supporting film and the second supporting film are each configured by a flexible printed circuit, and a coverlay is not provided in a region where the second conductive pad is disposed.

9. A method of manufacturing a temperature sensor, the method comprising:

a step (a) of stacking a first supporting film that is made of an electric insulation material and has one surface bonded with a sensor element, and a second supporting film that is made of an electric insulation material and is smaller in plane area than the first supporting film, in a state where the one surface faces the second supporting film, wherein the second supporting film includes a third conductive pad on a surface facing the region where the thermosensitive body is provided; and a step (b) of joining the first supporting film and the second supporting film, wherein the sensor element includes a thermosensitive body having electric characteristics that change with temperature, and a first lead pattern and a second lead pattern that are electrically connected to the thermosensitive body, and in the step (a), the second supporting film is stacked to cover a part of the first supporting film including a region where the thermosensitive body is provided, and the first lead pattern and the second lead pattern are electrically connected through the third conductive pad electrically connected to the thermosensitive body.

10. The method of manufacturing the temperature sensor according to claim 9, wherein the first supporting film includes a first conductive pad that supports the thermosensitive body and is electrically connected to the first lead pattern, and a second conductive pad electrically connected to the second lead pattern, and in the step (a), the first lead pattern and the second lead pattern are electrically connected when the third conductive pad is electrically connected to the first conductive pad and the second conductive pad.

* * * * *